Figure 1:
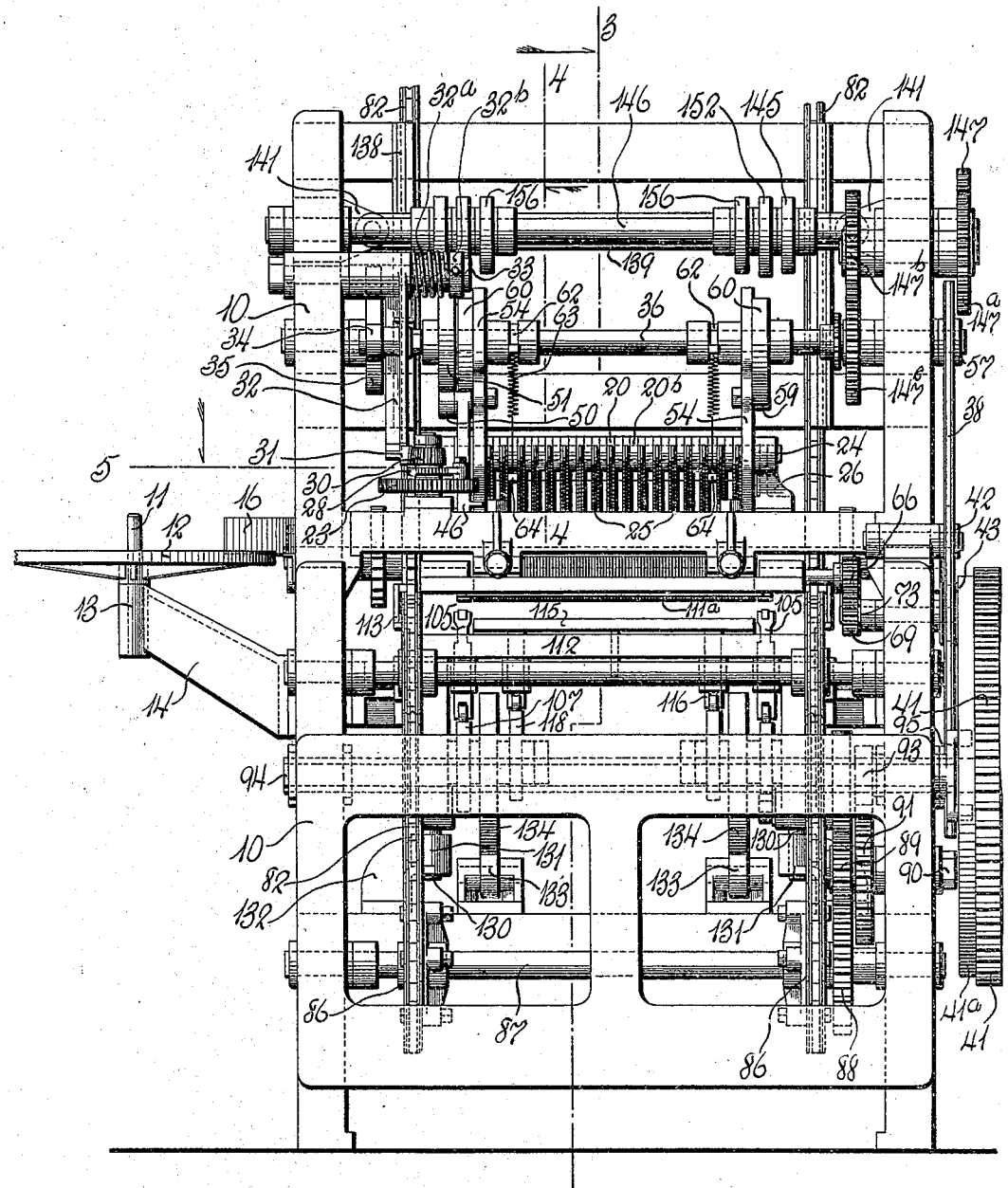

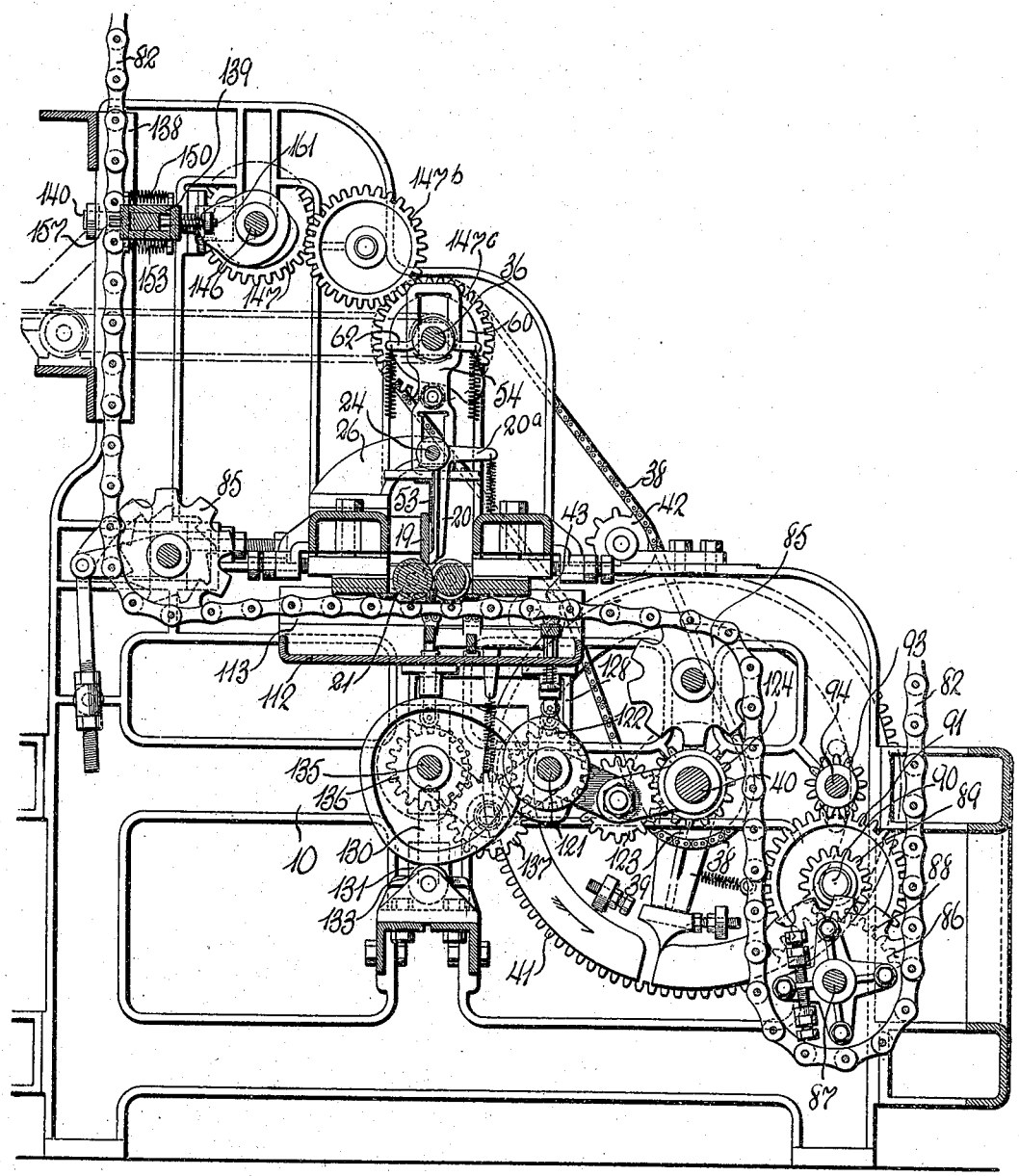

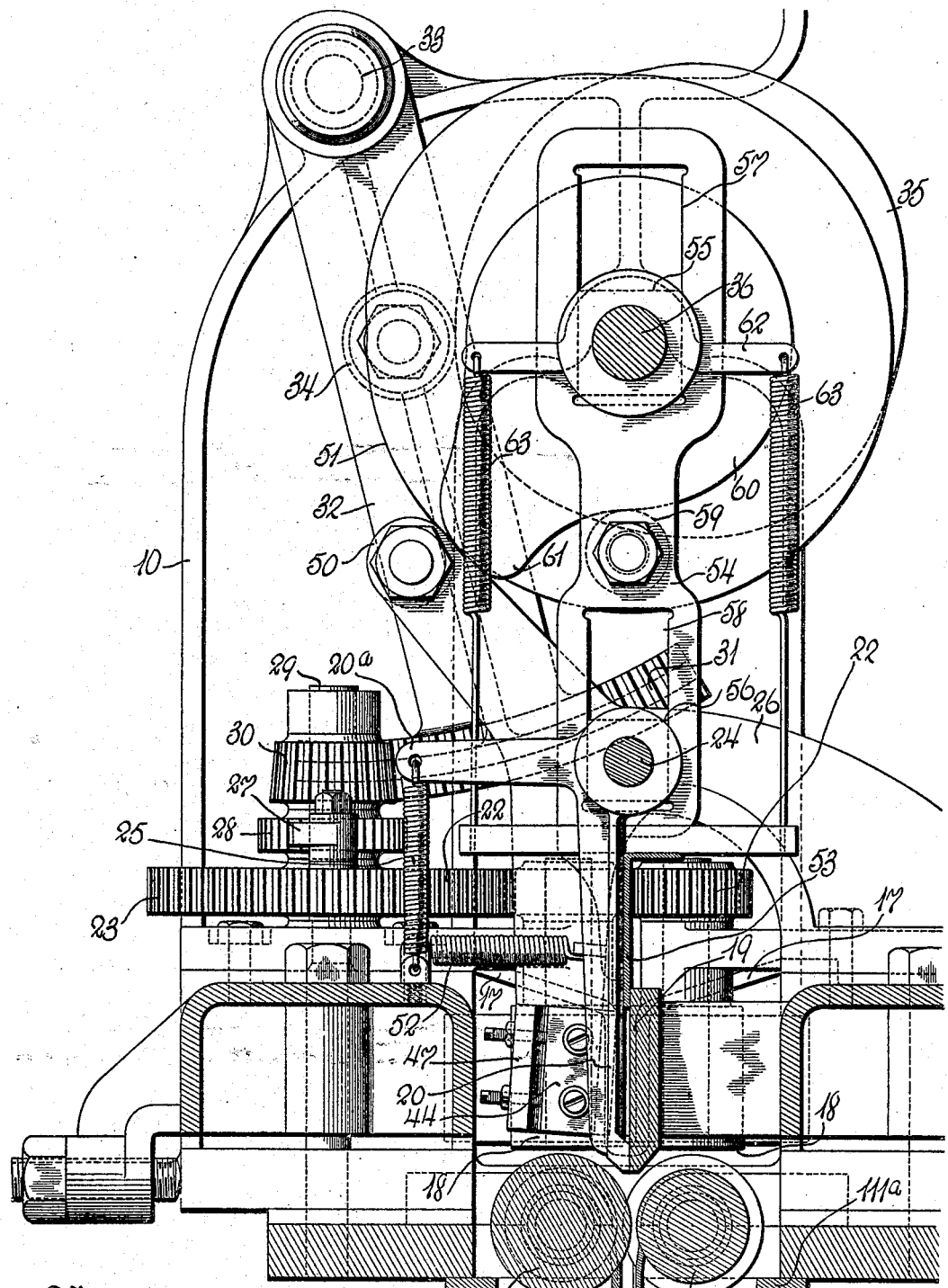

W. R. SWETT.
MATCH MACHINE.
APPLICATION FILED DEC. 30, 1908.
939,348.
Patented Nov. 9, 1909.
8 SHEETS—SHEET 5.
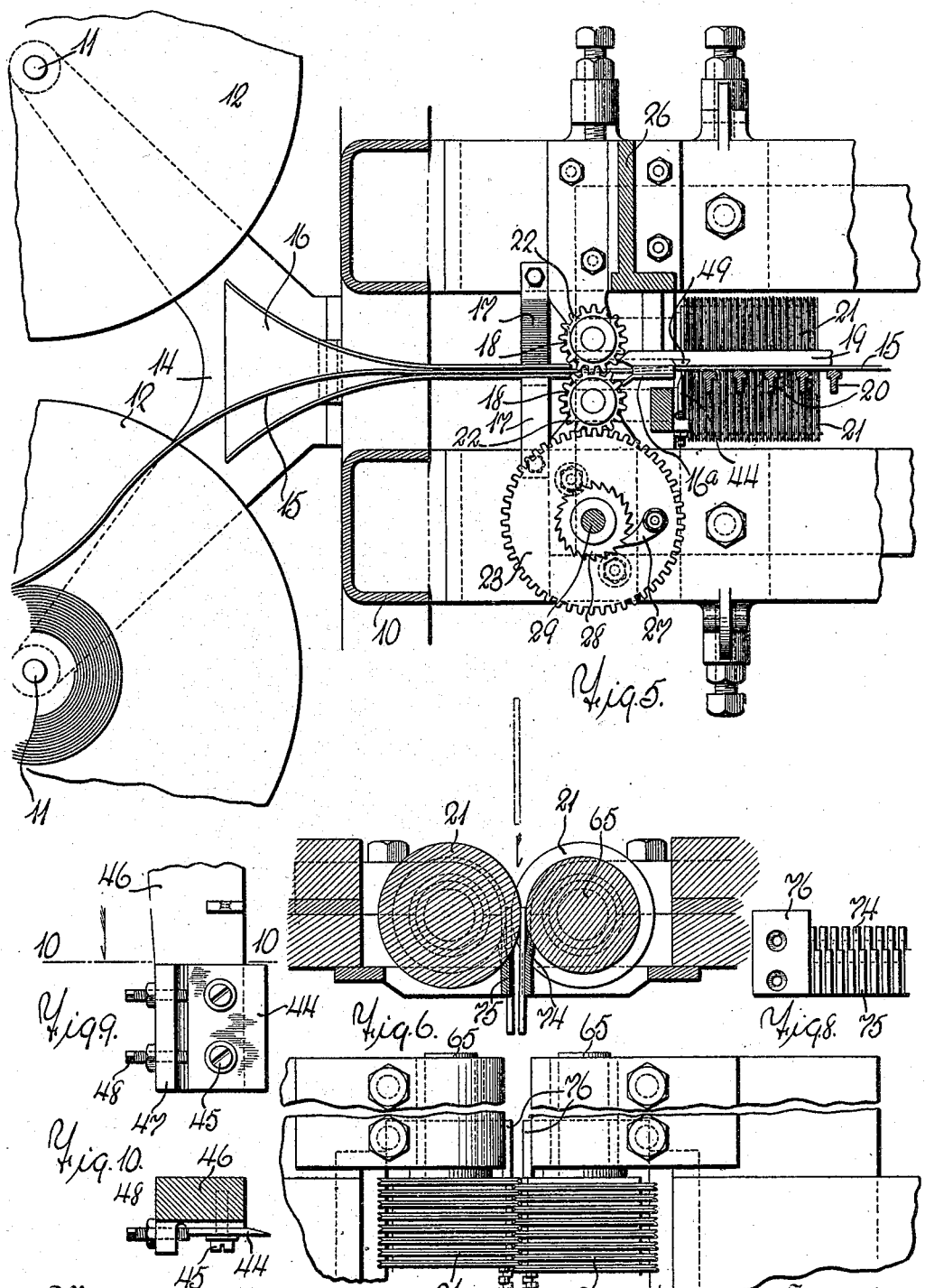
Witnesses:
Ralph Lancaster
Frank L. Stubbs
Inventor.
William Rogers Swett.
By his Attorney
W. P. Hutchinson.

W. R. SWETT.
MATCH MACHINE.
APPLICATION FILED DEC. 30, 1908.
939,348.
Patented Nov. 9, 1909.
8 SHEETS—SHEET 6.
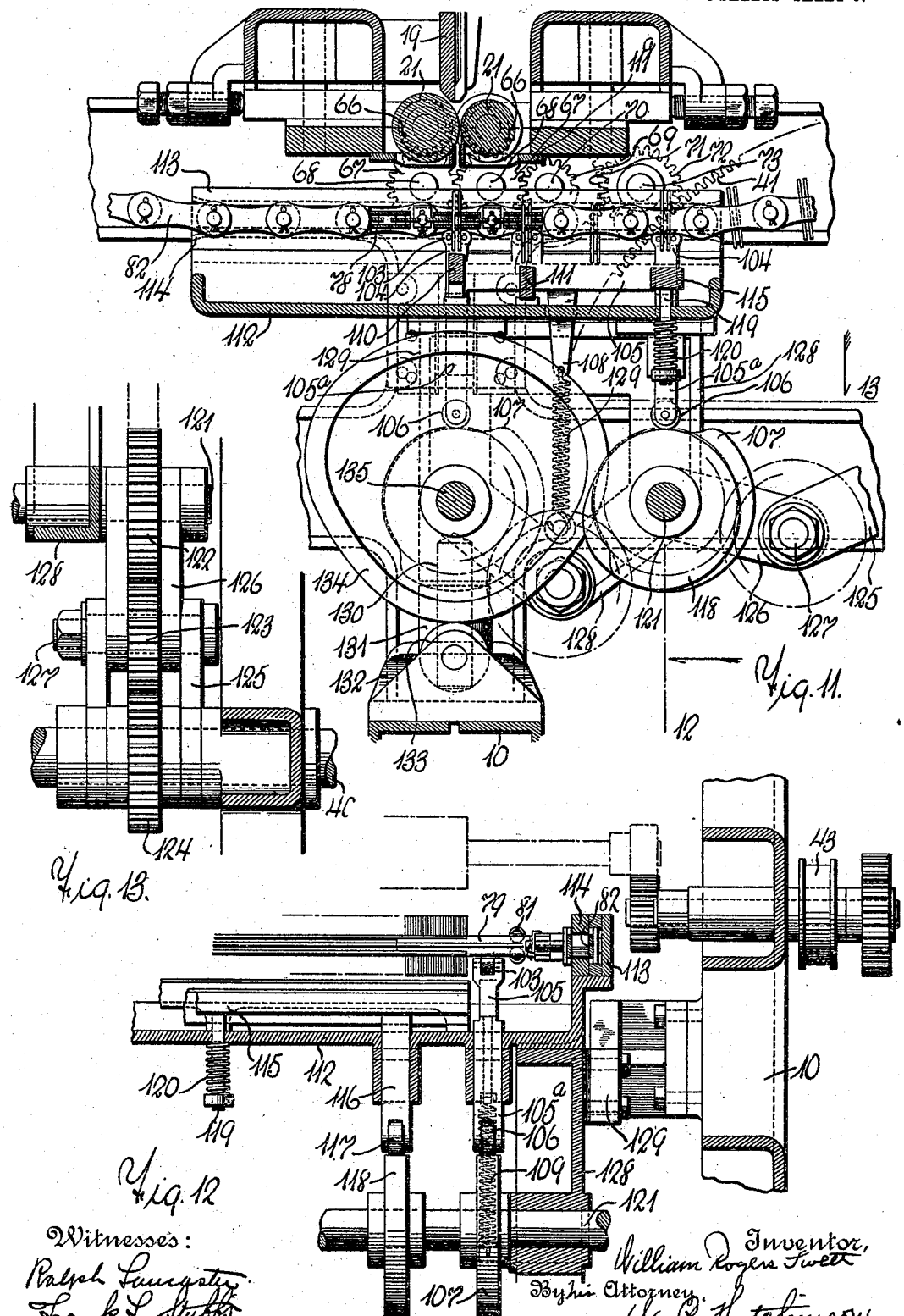

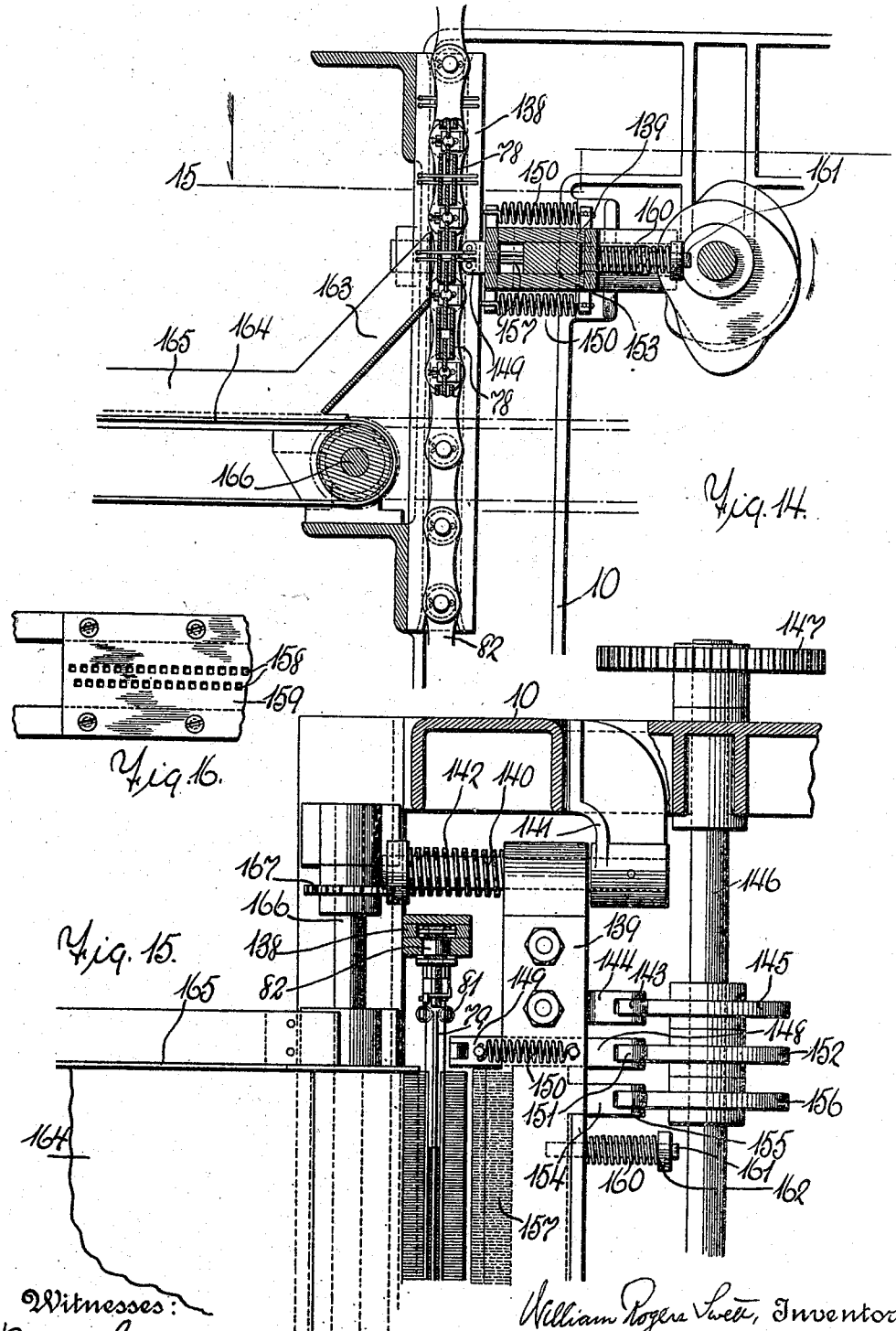

W. R. SWETT.
MATCH MACHINE.
APPLICATION FILED DEC. 30, 1908.
939,348.
Patented Nov. 9, 1909.
8 SHEETS—SHEET 8.
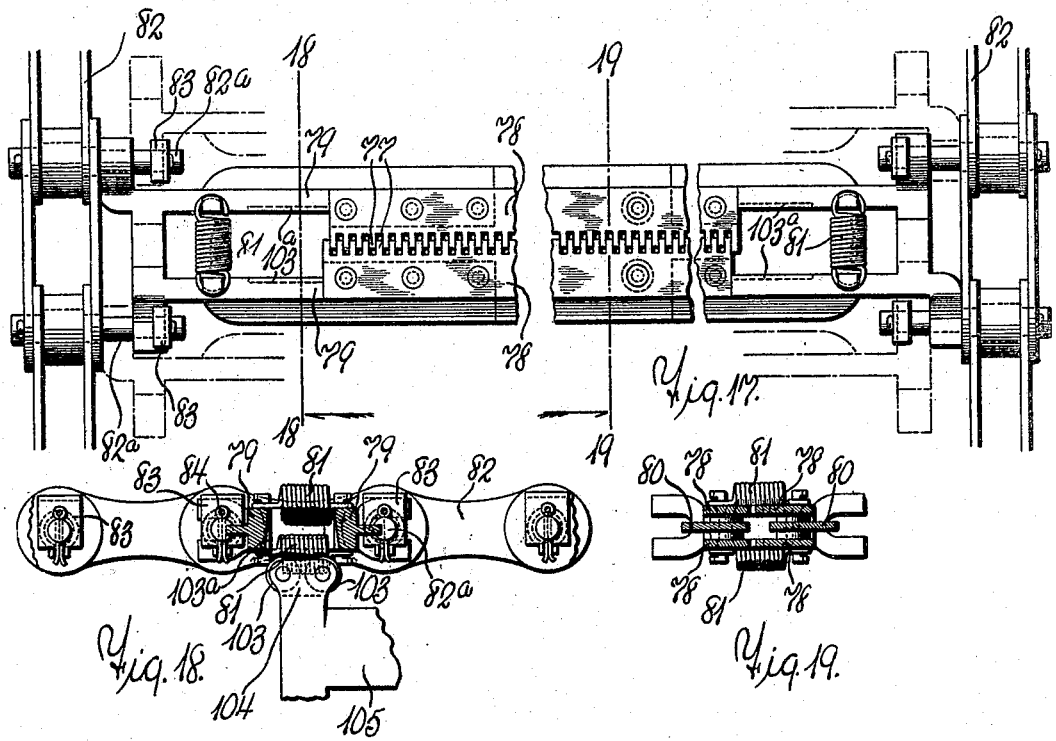
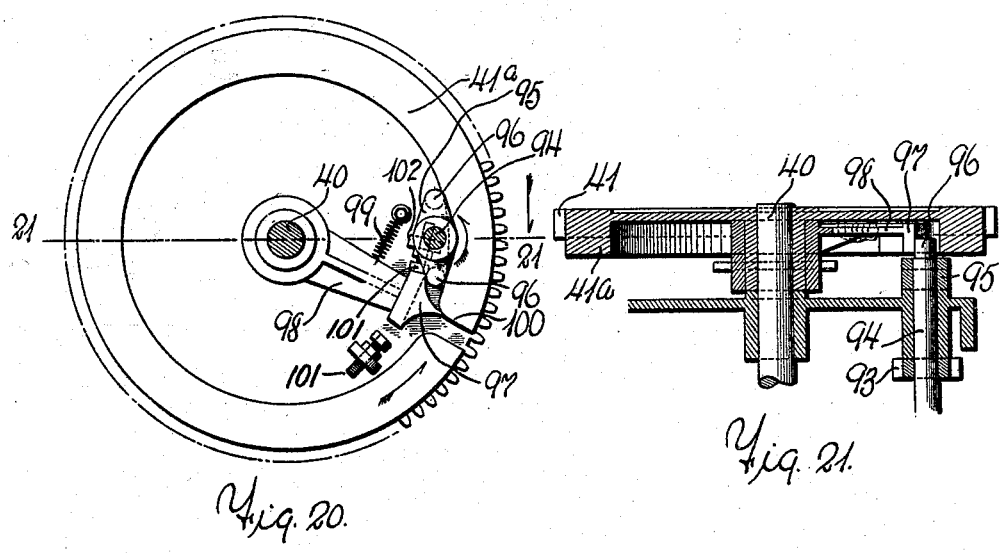
Witnesses:
Ralph Lancaster.
Frank L. Stubbs.
William Rogers Swett, Inventor,
By his Attorney
W. P. Hutchinson.

UNITED STATES PATENT OFFICE.

WILLIAM ROGERS SWETT, OF ROANOKE, VIRGINIA, ASSIGNOR TO ACME MATCH COMPANY, OF ROANOKE, VIRGINIA, A CORPORATION OF VIRGINIA.

MATCH-MACHINE.

939,348.  Specification of Letters Patent.  Patented Nov. 9, 1909.

Application filed December 30, 1908. Serial No. 470,050.

*To all whom it may concern:*

Be it known that I, WILLIAM R. SWETT, of Roanoke, Roanoke county, Virginia, have invented a new and useful Improvement in Match-Machines, of which the following is a full, clear, and exact description.

My invention relates to improvements in so-called continuous match machines in which the splints are cut from the stock and automatically delivered into a carrier ready for dipping in the paraffin and firing compositions.

My invention relates more particularly to that class of machines in which the stock used is a strip of veneer the width of which corresponds to the length of a match.

The general object of my invention is to produce a reliable match machine which will work faster, with less difficulty, and make matches cheaper than machines usually employed.

More specifically, my invention is intended to produce a machine in which strips of veneer of any length can be fed, and which will automatically cut off a strip of stock of the desired length, next feed it through a series of cutters, next deliver the splints into a carrier, next carry the splints to the ordinary compositions, and finally discharge the matches straight and ready for packing, upon a carrier belt or table.

My invention provides a machine in which the strips of veneer are fed in from the side, and are cut into short strips automatically before going to the cutters, so that it is possible to use short strips as well as long ones.

My invention is especially intended to provide a very reliable means for gripping and carrying the splints, and for leveling and discharging them.

Reference is to be had to the accompanying drawings forming a part of this specification, in which similar reference characters indicate corresponding parts in all the views.

Figure 2:
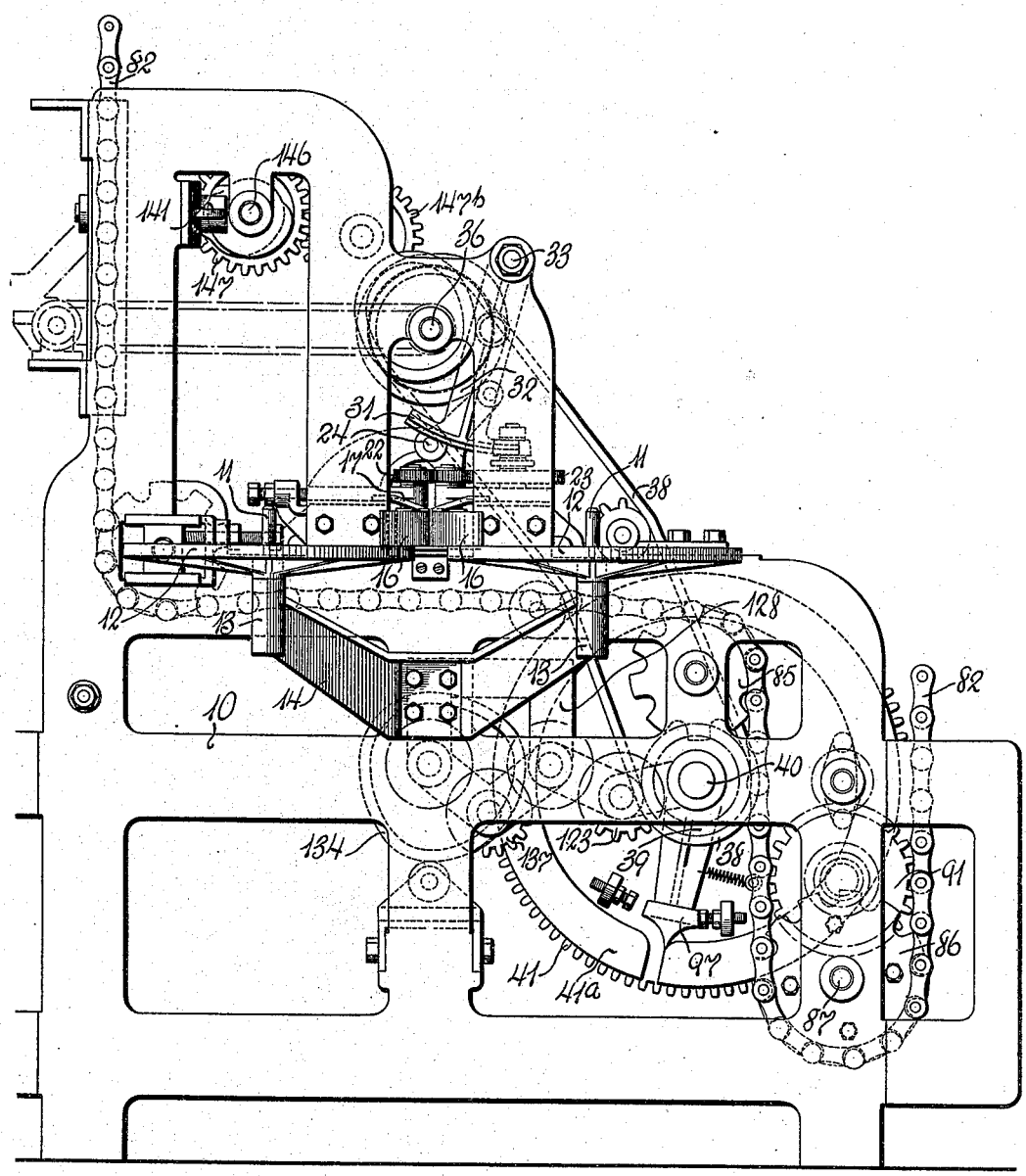

Figure 1 is an end view of the machine showing the end from which the finished matches are discharged. Fig. 2 is a side elevation showing the side from which the stock is fed into the machine. Fig. 3 is a longitudinal section on the line 3—3 of Fig. 1. Fig. 4 is an enlarged detail section on the line 4—4 of Fig. 1. Fig. 5 is a broken enlarged sectional plan on the line 5 of Fig. 1. Fig. 6 is a cross section taken through the cutters. Fig. 7 is a broken plan view of a portion of the cutters and their clearing combs. Fig. 8 is a detail of the combs which prevent the splints from sticking to the cutters. Fig. 9 is a detail of the cut-off knife and its supporting arm. Fig. 10 is a section on the line 10—10 of Fig. 9. Fig. 11 is a detail longitudinal section showing especially the gripping and leveling mechanism for holding and leveling the splints. Fig. 12 is a section on the line 12 of Fig. 11. Fig. 13 is a broken sectional plan on the line 13—13 of Fig. 11. Fig. 14 is a detail sectional view showing the means for discharging the matches. Fig. 15 is a broken sectional plan on the line 15 of Fig. 14. Fig. 16 is a detail of one of the guides of the match ejector. Fig. 17 is a broken detail plan of a section of the splint carrier, showing the gripping fingers. Fig. 18 is a cross section on the line 18—18 of Fig. 17. Fig. 19 is a section on the line 19—19 of Fig. 17. Fig. 20 is a detail elevation of the means for controlling the intermittent feed of the carrier chains, and Fig. 21 is a cross section on the line 21—21 of Fig. 20.

The machine is provided with a suitable frame 10, and on one side of the machine are supported spindles 11 which are arranged preferably in pairs, and each projects above a stock table 12, the spindles being removably supported in sleeves or bearings 13 which are carried on brackets 14. The veneer stock 15 usually comes in rolls as shown in Fig. 5, and two rolls are placed on the spindles 11, and the stock is fed into the machine through a converging horizontally arranged guide 16. Only one strip of stock is fed at a time, but by having two strips conveniently disposed as shown, the operator can instantly insert a strip to follow up the strip already used, and thus there will be no loss of time and no spaces in the splint carrier which are unfilled. The guide 16 is supported on brackets 17, and the stock is gripped at the inner end of the guide by feed rollers 18 which are vertically arranged and which are such as are generally used for feeding sheet stock to a machine. The stock as it passes through the rollers, is forced through a guide 16ª and into the stock holder 19, and between one wall of the stock holder and a series of spring fingers 20 so that the stock is held steadily above the rotary cutters 21, these being disk cutters which interlock as shown in Fig. 7, and for which no novelty is claimed in detail. The spring fingers 20 are preferably rigid, and are provided each with a yielding spring though of course the fingers might be of spring material themselves. The arrangement shown is better, however, and as illustrated they are elbow shape and mounted on a shaft 24, and the short arm 20ᵃ of each finger connects with a spring 25 which is secured to a convenient part of the frame 10. The fingers are recessed opposite the holder 19 as shown clearly in Fig. 4, so that the stock is held nicely in place but can be easily pushed down from the grip of the fingers and between the cutters 21. The shaft 24 is supported in suitable brackets 26 which rise from the machine frame.

The feed rolls 18 above referred to are connected by gears 22 (see Fig. 5) and one of these is driven by a gear wheel 23 which turns loose on the vertical stud 29. The gear wheel carries a pawl 27 which engages a ratchet wheel 28 on the said shaft, and the ratchet wheel is fast to a pinion 30 which is oscillated backward and forward by the oscillating segment or rack 31, but owing to the ratchet connection just described, the wheel 23 will only be turned forward so as to actuate the feed rolls intermittently and give them a rapid movement sufficient to carry the stock 15 forward across the length of the cutters 21. The segmental rack 31 is secured to an oscillating arm 32 which is pivoted to a stud 33 on which it is loose, but it has a spring 32ᵃ on the stud connecting with the arm and also with a collar 32ᵇ so that the roller 34 on the arm 32 is held snug against a cam 35 on the cross shaft 36, and this cam is timed to give the proper swinging movement to the arm 32.

The shaft 36 can be rotated in any convenient way, but I have shown it provided with a sprocket wheel 37, and this connects by means of a chain 38 with a sprocket wheel 39 on the driving shaft 40 (see Figs. 2 and 3) and the driving shaft is provided with a gear wheel 41 which can be geared direct to a motor or any other suitable means can be used for driving the shaft 40. I have shown the driving chain 38 running over idlers 42 and 43 (see Fig. 3), but this driving mechanism together with other driving parts which will be described, is shown and described merely to show that the machine is operative, and not with the idea of confining the invention to any particular means of driving.

The next step after feeding the veneer to a point above the cutters and in the holder 19, is to cut the stock off so that it will be of the right length to pass between the cutters and be cut into splints. I accomplish this by a cut-off knife 44 shown in detail in Figs. 9 and 10, and this cut-off knife is arranged on the lower end of a swinging arm 46 to which it is held by screws 45, and it is adjusted by screws 48 which pass through a boss 47 on the lower end of the arm. When the arm is moved forward, the knife 44 cuts through the stock and against a block 49 in the holder 19, this arrangement being shown clearly in Fig. 5. The cut-off arm 46 is pivoted on the shaft 33 (see Fig. 4) and is provided with a roller 50 which runs against a cam 51, which cam is secured to the shaft 36 already described. The roller can be held against the cam in any convenient way, as by means of a spring such as already shown applied to the arm 32. After the stock is cut off as described, the next step is to feed it downward into the grip of the cutters 21. This is accomplished by means of the vertically sliding plunger 53 which is carried by the two slide frames 54, shown in Figs. 1 and 4, and these have boxes 55 and 56 (see Fig. 4) which receive the shaft 24 and 36. The arms have slideways 57 and 58 so that the arms can move up and down on the boxes 55 and 56, and the side frames are moved down by means of the rollers 59 which contact with the cams 60 on the shaft 36. The cams have sharp noses 61 which are adapted to give the side frames 54, and consequently the plunger 53, a sharp downward movement. The cams 60 act against the tension of the spring 63 which is secured to yokes 62, and the latter straddle the shaft 36 as shown in Fig. 4, while the lower ends of the springs are attached to cross bars 64 which are secured to the side frames 54. The next step is to cut the splints, and this is accomplished by the disk cutters 21 which interlock as shown in Fig. 7, so as to cut smoothly, and they have a tendency to force the alternate splints in opposite directions as shown in Fig. 6. They are rotated oppositely so as to be self feeding, and they are secured to mandrels 65 which are provided with gears 66, shown by dotted lines in Fig. 11, and these gears mesh with pinions 67 which are geared together and are mounted on studs 68, while one of the gears 67 meshes with a pinion 69 on the shaft 70, and this shaft has a gear 71 on its opposite end meshing with a gear 72 on the shaft 73, and the latter is geared directly to the main driving gear 41. Obviously any other suitable mechanism can be used for rotating the cutters.

As the splints are cut they are forced between the cutters 21 and have a tendency to stick. To obviate this, combs are used which have teeth 74 and 75, the former being longer than the latter, which project up into the cutters as shown clearly in Figs. 6 and 7. The shorter teeth come opposite the cutters and the longer ones project between them. These combs have end plates 76 by which they can be secured to the main frame, and it will be seen by reference to Fig. 6, that the splints as they are cut, are prevented by the combs from following around with the cutters, and must be driven vertically downward. As the splints descend from the combs 74 and 75 they are delivered between the interlocking fingers 77 (see Fig. 17) of the plates 78, which form a part of the main splint carrier. Plates with these interlocking fingers have been used heretofore, but I arrange the plates in duplicate one above the other, as shown in Fig. 19, so that the match splints will be gripped at two well separated points in their length, thus holding them very rigidly. They are further steadied by the plates 80 which slightly bend the splints to further insure a firm hold and the plates 78 and 80 are both attached to the cross bars 79 which are held normally close together by the springs 81 which connect every adjacent pair of cross bars on the upper and lower sides, as shown clearly in Figs. 17 and 19. The outer ends of the cross bars 79 are flanged and fitted over the pivots 82ª of the double link chains 82, which are the main carrier chains. The cross bars can be secured to the pins 82ª in any convenient way, but I have shown L shaped clips 83 perforated to receive the pins and overlapping the adjacent ends of the cross bar, the clips being held in place by collet pins 84. It will be noticed by reference to Fig. 17 that this construction provides for gripper bars by which I term generally the plates 78 with their fingers 77, that these gripper bars are arranged in pairs, and that they can be carried along evenly and nicely by the chains 82. The chains 82 pass along opposite sides of the machine over suitably disposed sprocket wheels 85 which are arranged to guide the chains, and after leaving the mechanism for cutting the splints and putting them in the carrier, the chains lead the splints to the ordinary paraffin and firing compositions, which are not here shown because the usual simple mechanism can be employed with the form of carrier which I illustrate, and it is an object of my invention to use a type of carrier which permits this ordinary treatment of the splints. The chains 82 must be driven intermittently and this can be accomplished in many ways. I prefer the mechanism which I have shown, however, and as illustrated, the sprocket chains 82 are driven by sprocket wheels 86 on a shaft 87 (see Figs. 1 and 2). The shaft 87 is driven by means of a gear 88 which meshes with a pinion 89 on the shaft 90, and this has a gear wheel 91 driven by a pinion 93 on the shaft 94, which is given an intermittent motion by the mechanism shown in detail in Figs. 20 and 21. This shaft 94 is provided with an arm 95 which has off-sets or bosses 96 at the ends, extending beneath the rim 41ª of the main driving gear 41 on the shaft 40 already referred to. These off-sets or bosses 96 are adapted to engage the flanged or pointed end 97 of a finger 98 which is journaled on the shaft 40, and has its point extending into the slot 100 in the rim of the wheel 41, while the pointed end 97 is held against the forward wall of said slot by a spring 99. This finger 98 moves between adjustable abutments consisting of the bolts 101 which turn in the flanges 102 in the side of the wheel 41. The wheel 41 turns in the direction of the arrow in Fig. 20, and as the forward boss 96 of the arm 95 strikes the pointed end 97 of the finger 98, it will be guided into the slot 100, and the arm 95 and shaft 94 will be given a half turn, thus giving the necessary intermittent motion to the train of gearing above described and connecting with the sprocket chains, so that the carrier will be given the necessary step forward. By reference to Fig. 21 it will be seen that the second boss 96 of the arm 95 can clear the finger 98, and so the arm turns over into position to be again turned half way at the next revolution of the gear wheel 41ª. The bolts 101 lie behind the path of the bosses 96, so that the bosses can clear the bolts as will be seen by reference to Fig. 21.

When a series of splints pass from the cutter into the gripper bars of the carrier, it is necessary for these to be opened, and as the carrier continues, the gripper bars have to be opened also to provide for properly leveling the splints, so that they will be in good shape to receive the match ends. To provide for opening these gripper bars, I use rollers 103 which are journaled on the top extensions 104 of the two side frames 105 at opposite sides of the machine, and beneath the cutters, as best shown in Figs. 11 and 18. Two sets of gripper bars are opened at once so that the final leveling can take place at the same operation that opens the grippers to receive their splints. These side frames 105 are moved upward by means of depending legs 105ª which carry rollers 106, the latter riding on the two cams 107 on each side of the machine, these cams operating together but being carried by shafts 121 and 135 (see Fig. 11) which will be presently referred to. The frames 105 are moved upward against the tension of the springs 109 which are secured to bosses 108 on the under side of the frame and which are also secured to the main frame as shown in Fig. 11.

A very important feature of the invention is the lift plate or table 112 which is adapted to lift the carrier and its gripper bars upward into close contact with the cutting mechanism as the splints are cut, so that the splints may be accurately delivered from the combs 74—75 between the gripper fingers 77. The lift plate or table 112 has vertical side flanges 113 (see Fig. 11) and in these flanges are ways 114 (see Fig. 12) to receive the chains 82. Thus the chains are carried positively and in a rigid horizontal position through the lift plate or table, and the chains and the gripper bars with them move up and down with the table. Rigid on the table and moving therewith, are leveling bars 110 and 111 which are spaced apart a distance corresponding to the distance between the groups of splints in adjacent grippers, and the first named leveler bar 110 prevents the splints from dropping down too low when they are delivered into the grippers, and the next bar 111 serves to push up the bottoms of the splints and level them against the bar 111a. After the carrier has been stepped forward a few points, the splints are given a final leveling by the leveling table 115 which moves independent of the lift plate or table 112, and is placed opposite a set of opening rollers 103, as are also the bars 110 and 111, so that when the leveling table moves up, the splints will be loose so as to be properly leveled.

I wish to call attention to the fact that the bars 79 of the grippers are beveled a little on the inner sides as shown at 103a in Fig. 18, so that the opening rollers 103 can move readily in between them and have a wedge action thereon. The leveling bar or table 115 is moved up by the legs 116 on its under side, which legs project downward through the lift plate 112 and are provided with rollers 117 which ride on the cams 118, these being carried by the shaft 121. The rollers are held in close contact with the cams 118 by means of the springs 120 which are coiled around the arms 119 on the under side of the table or bar 115, and the springs are arranged between collars in the ends of the arms and the lift plate 112.

The shaft 121 which carries the cams 118 and two of the cams 107, is driven by a train of gearing 122—123—124, connecting back to the main driving shaft 40, and as the shaft 121 is movable up and down with the frame 128, as presently described, links 125 and 126 are used to form the connection between the two shafts 121 and 40, and the middle gear 123 is pivoted on the stud 27 which serves as a pivot of the connecting links as shown clearly in Fig. 13.

A slide frame 128 is arranged in each side of the machine beneath the lift plate 112 to which the frames are attached, as shown clearly in Fig. 12, and the side frames 128 move between suitable guides 129 on the main frame 10. The side frames 128 are guided at the bottom by rods 130 which are held rigidly on the frames, and enter bearings 131 on the brackets 132 which are attached to the main frame. On these brackets are rollers 133, and on these run the large cams 134 which are secured to the shaft 135 which is journaled in the side frames 128. The shaft 135 connects with the shaft 121 by the gears 136 and 137, the latter meshing with a gear 122 on the shaft 121, which gear has already been referred to. It will be seen, therefore, that the rotation of the cam 134 on the wheels or rollers 133, will give the necessary up and down motion to the side frames 128 and to the lift plate 112. Consequently, the lift plate is raised just as a series of splints are delivered from the combs 74 and 75, the grippers are opened at this moment by the rollers 103, and the splints fall readily between the gripping fingers 77 and upon the leveling bar 110. When the movement next occurs, the splints already in the carrier will have been advanced to the bar 111, which will rise with the table and so level the splints first delivered to the carrier. At the next alternate step, the splints in the carrier will be opposite the leveling bar or table 115, and it will be seen by reference to the cams in Fig. 11, that this bar will move upward and that the movement will follow the movement of the lift plate and the movement of the side frames 105, so that it will finally and nicely level the splints before the chains leave the ways 114 in the sides of the lift plate.

The action of the lift plate and the accessory parts is important, and is as follows. As a pair of grippers come directly below the cutting mechanism, the table moves up, the grippers are opened by the rollers 103 so that the splints are dropped easily between the fingers 77 of the grippers, and they are approximately leveled by the cross bar or leveling bar 110. The lift plate is then lowered and the chains stepped forward ready to receive a new set of match splints. At the next movement the first set of splints are further leveled by the leveling bar 111. The grippers continue to step forward by the mechanism already described and finally just before the grippers leave the lift plate, the leveling table 115 is moved up and gives the splints while they are loosened as already stated, their final leveling, and the arrangement described insures having the ends all on the same horizontal plane. This is very important because the splints are automatically dipped, and unless the ends are thoroughly leveled there will be necessarily many bad matches. After the splints are finally leveled and arranged in the grippers they are carried forward by the chains 82 and dipped in paraffin and firing compositions precisely as usual, and I have not here shown any mechanism for this because such operations are thoroughly understood in the trade. The ejecting features of my machine are, however, important, and these are shown in detail in Figs. 14 to 16. At the point where the ejecting takes place, the chains and grippers, or in other words, the carrier, descends vertically through guide ways 138 (see Fig. 14) and as the whole chain is carried forward by a step by step movement, the same action of course takes place here. At one of the momentary stops the grippers and their matches come to rest opposite the horizontally moving cross head 139 which slides on the guide rods 140 supported on the main frame and on brackets 141. The cross head has springs 142 so as to force the rollers 143 which are supported in arms 144 on the back of the cross head, against actuating cams 145 which are carried by the shaft 146 this shaft having a gear wheel 147 connecting by gears 147ª, 147ᵇ and 147ᶜ with the shaft 36. The cam thus causes the cross head to move backward and forward against the tension of the springs 142. A pair of slide arms 148 work at the cross head 139 and carry rollers 149 which are adapted to enter between the bars 79 of the grippers like the rollers 103 already referred to, and open the grippers. The slide arms 148 are repressed by springs 150 and the rollers 151 on the inner ends of the arms are by the springs held in contact with cams 152 on the shaft 146. The cross head 139 is hollow, and within it is a pusher bar 153 which moves horizontally forward and backward, and it has rearwardly and inwardly extending arms 154 carrying rollers 155 which contact with cams 156 on the shaft 146. The pusher bar 153 has on its front or outer edge, plungers 157 of a size corresponding to the match splints, and these plungers move through perforations 158 in the guide plate 159 which is attached to and forms a part of the cross head 139. Normally the outer ends of the plungers 157 are flush with the face of the guide plate 159. The pusher bar is held retracted by springs 160 acting on studs 161 and arranged between the back of the cross head 139 and collars 162 on the studs 161.

To provide for catching the matches and holding them straight, a chute 163 is arranged in front of the ejecting mechanism, and delivers upon an endless carrier or belt 164 which moves between guide walls 165 and is carried by a shaft 166 having a sprocket wheel 167 or other driving means.

The action of the ejecting mechanism is as follows. As the carrier comes to rest opposite the cross head 139, the cams 152 push forward the slide arms 148 and open the set of grippers which is just above the chute 163. Just as this occurs, the cross head 139 moves forward under the impulse of the cams 145 and the cams 156 move forward the pusher bar 153 so that the plungers 157 remain flush with the face of the guide plate 159 until the guide plate comes up against the plates 78 of the gripper. At this point the cams 156 give a final impulse to the pusher bar 153, thus causing the plungers 157 to project from the guide plate and between the plates of the gripper so that the matches are cleanly ejected from the gripper and into the chute 163. This scheme for ejecting the matches is important, because where plungers are used to drive them out of the holding means, many match splints are broken, but by having the cross head move with a solid face against the loosened splints, it will be seen that they are struck firmly so that they are not slivered or broken, and the plungers 157 only give the final impetus to the splints, and the result is that the splints are left clean and unbroken in the chute and on the carrier 164. When the plungers 157 are withdrawn through the guide plate 159, the latter cleans the plungers of any slivers that might adhere to them. From this carrier the splints can be removed by hand in the ordinary way and packed in boxes, or they can be discharged into a suitable boxing machine.

I am aware that the general means for cutting the splints and for cutting off the stock above the cutter, are shown in the patent to Parker, #682,228, of September 10th, 1901, and also that said patent shows the general arrangement of the gripper, but it will be seen that my improvement provides for more accurate cutting, for a better delivery of the stock to the cutters, and for a much firmer means of gripping the individual splints, while the other features of the invention provide for carrying the splints firmly and steadily, for leveling them nicely, and for discharging them in clean, unbroken condition.

Having thus fully described my invention, I claim as new and desire to secure by Letters Patent:—

1. In a match machine, the combination with the splint cutters, of a stock holder directly above the cutters, spring pressed fingers held opposite the stock holder, means for feeding the stock into the stock holder and between it and the fingers, means for cutting off the stock, and means for pushing the stock between the cutters.

2. In a match machine, the combination with the cutters and the stock holder above the cutters, of a series of elbow fingers pivoted above the stock holder and extending to a point opposite it, means for holding one of the members of each finger against the stock in the stock holder, means for feeding stock into the stock holder and between it and the fingers, means for cutting off the stock in the stock holder, and means for feeding the stock to the cutters.

3. In a match machine, the combination with the cutters and the stock holder above the cutters, of a horizontally disposed guide arranged opposite one end of the cutters and delivering to a point above them, and plural stock tables having spindles thereon, each table being adapted to deliver stock into the guide.

4. In a match machine, the carrier, comprising carrying chains, separable cross bars supported on the chains, pairs of plates spaced apart on the chains and each pair provided with interlocking fingers, and steadying plates arranged between the said finger plates.

5. In a match machine, the combination of the carrier having separable plates with interlocking fingers, of opening devices, cam actuated and carrying rollers adapted to enter between and separate the members of the carrier.

6. A match machine comprising splint cutters arranged to cut sheet stock into a series of splints, a carrier moving opposite the cutters to receive the splints, said carrier having grippers to receive the splints, a lift plate movable opposite the cutters and arranged to move the carrier into close proximity to the cutters, and means operating in conjunction with the lift plate to open and close the grippers and level the splints.

7. The combination with the rotary cutters turning in stationary bearings and a carrier moving opposite the cutters and having means for receiving splints therefrom, of the flat lift-plate movable toward and from the cutters and adapted to bring the carrier into close proximity to the cutters as the latter discharge their splints, and means acting in conjunction with the movement of the lift-plate to open the carrier to receive the splints.

8. The combination with the cutters and the splint receiving carrier moving opposite the cutters, of means for moving the carrier toward and from the cutters, means for opening the carrier as it comes to a point near the cutters to receive the splints, and means for leveling the splints as they are received by the carrier.

9. The combination with the cutters and the splint receiving carrier having a step by step movement past the cutters, of means for moving the carrier toward and from the cutters opening the carrier and leveling the splints as they come from the cutters, and means for again opening the carrier and leveling the splints at a still subsequent step of the carrier.

10. The combination with the cutters and the splint receiving carrier having a step by step movement past the cutters, of means for moving the carrier toward and from the cutters opening the carrier and leveling the splints as they come from the cutters at every movement of the carrier toward the cutters.

11. The combination with the cutters and the splint receiving carrier, of a lift plate serving as a guide for the carrier and movable toward and from the cutters, and means operating in conjunction with the lift plate to open the carrier to receive the splints and to level the splints so received by the carrier.

12. The combination with the cutters and the splint receiving carrier moving step by step opposite the cutters, of a lift plate guiding and supporting the carrier as it passes the cutters, means for moving the lift plate toward and from the cutters, means for opening the carrier to receive the splints as the lift plate moves toward the cutters, and means acting independently of the lift plate to open the cutters and level the splints in the carrier.

13. The combination with the cutters and the carrier moving step by step opposite the cutters, of a lift plate having guide ways therein to receive the carrier, means for moving the lift plate toward and from the cutters, leveling bars carried by the lift plate, means for opening the carrier to the action of the leveling bars, and a leveling bar or table movable independent of the lift plate and arranged to finally level the splints in the carrier.

14. In a continuous match machine having a splint carrier with openable parts, the ejecting mechanism comprising a cross head movable against the splints in the carrier, means for opening the carrier by the action of the cross head, and plungers carried by the cross head and moving into the carrier.

15. In a match machine having a splint carrier with openable members, the ejecting mechanism, comprising a hollow cross head movable toward and from the carrier, opening devices carried by the cross head to open the carrier, a perforated guide plate on the face of the cross head, a pusher bar movable within the cross head, plungers on the pusher bar extending into the perforations of the guide plate, means for simultaneously moving the cross head and pusher bar, and means for finally and independently moving the pusher bar.

WILLIAM ROGERS SWETT.

Witnesses:
CHAS. F. SWARTZ,
CLARENCE W. STROH.